No. 649,477. Patented May 15, 1900.
H. P. QUIN.
BREECHING.
(Application filed Mar. 6, 1899.)
(No Model.)
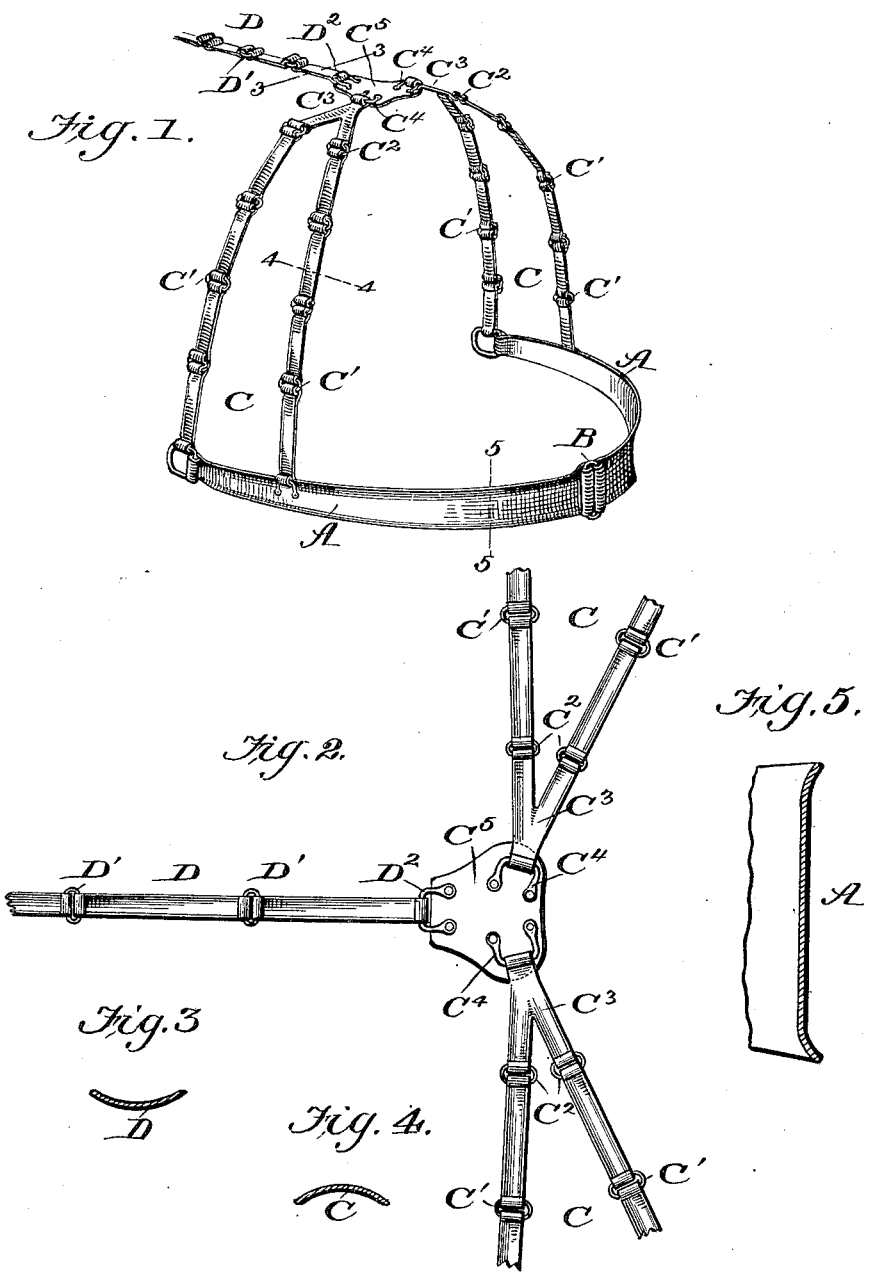
WITNESSES:
Jos. A. Ryan
Percy B. Turpin.
INVENTOR
Hugh P. Quin
BY Munn & Co.
ATTORNEYS.

United States Patent Office.

HUGH PHARR QUIN, OF WASHINGTON, GEORGIA.

BREECHING.

SPECIFICATION forming part of Letters Patent No. 649,477, dated May 15, 1900.

Application filed March 6, 1899. Serial No. 707,938. (No model.)

*To all whom it may concern:*

Be it known that I, HUGH PHARR QUIN, a citizen of the United States, residing at Washington, in the county of Wilkes and State of Georgia, have made certain new and useful Improvements in Harness, of which the following is a specification.

This invention relates to harness of that class composed practically entirely of metal; and it has for its object to provide an improved harness of this character which shall be light, yet strong and durable, and one that will not gall the flesh of the animal, which object is accomplished by the construction of harness hereinafter described, shown in the drawings, and then specifically pointed out in the claim.

In the drawings, Figure 1 is a perspective view of my improved harness. Fig. 2 is a partial top plan view thereof; and Figs. 3, 4, and 5 are cross-sectional views, respectively, on lines 3 3, 4 4, and 5 5 of Fig. 1.

The harness comprises the breeching, having the side sections A, whose rear ends are connected by the link B, which is pivoted to both the sections A to allow freedom of movement; the side straps C, which are jointed at their lower ends to the sections A and are composed of sections united together by links $C'$, the upper sections being connected by links $C^2$ to a double-arm section $C^3$, whose upper end is jointed by a link $C^4$ to the metal crown-plate $C^5$, and the back-strap, which is composed of sections D, jointed together by the links $D'$, and the end link being jointed to the crown-plate by the link $D^2$, as best shown in Figs. 1 and 2.

The links $C^4$ are disposed wholly within the area of the plate $C^5$, and the connections of the sections $C^3$ therewith are wholly within the area of this plate, as seen clearly in Fig. 2, so that in the movements of the parts the friction is all on the plate, and thus rubbing of the flesh of the animal is prevented.

From Figs. 3, 4, and 5 it will be seen that each of the plates is made convex on its inner side in cross-section. The purpose of this is twofold. In the first place it furnishes a smooth rounded surface, which will avoid chafing the animal at any point. Again, this construction in addition to furnishing a smooth surface to bear against the animal increases the strength of the plates and renders practicable the use of thin light malleable-iron or other suitable metal plates.

It will thus be seen that I provide a harness that will be not only light and strong, but which will be comfortable to the animal at all points where it touches him and the rubbing and galling of the flesh by the harness in the movements of the animal avoided.

The harness may be finished in any suitable manner, as will be readily understood.

It is evident that by my harness I furnish one of great durability, strength, and economy in manufacturing, which can be conveniently made at a low price and will be practically indestructible.

In manufacturing the harness can be made in different sizes to fit large or small horses.

Having thus described my invention, what I claim, and desire to secure by Letters Patent, is—

The herein-described breeching for harness consisting of metal sections hinged at their adjacent ends, the metal crown-plate, links on the upper face thereof wholly within the area thereof, V-shaped metal sections pivoted on said links within the area of the crown-plate, metallic side straps in pairs each formed of pivotally-connected metal plates and pivotally connected to the said V-shaped sections, and a back-strap of hinged metallic sections pivotally connected to said crown-plate, the sections of the rear, side and back-straps all being concavo-convex in cross-section, substantially as and for the purpose specified.

HUGH PHARR QUIN.

Witnesses:
 LORENZO SMITH,
 A. A. BARNETT.